United States Patent Office 2,935,411
Patented May 3, 1960

2,935,411

HIGH DIELECTRIC CONSTANT CERAMICS

Preston Robinson, Williamstown, Mass., assignor to Sprague Electric Company, North Adams, Mass., a corporation of Massachusetts No Drawing. Application March 29, 1956
Serial No. 574,621

1 Claim. (Cl. 106—39)

This invention relates to a process for producing sintered articles useful in the electrical arts. More particularly the process is concerned with high dielectric constant ceramic materials and high permeability ferrites. This application is a continuation-in-part of my co-pending application Serial No. 263,988, filed December 28, 1951, now abandoned.

Of the high dielectric constant ceramic materials the best known examples are the alkaline earth titanates including mixtures of barium and strontium titanates as disclosed in the Burnham et al. U.S. Patent 2,563,307, issued August 7, 1951. Ceramics of these types are difficult to produce in a voidless composite body because of their tendency to decompose before they melt so that they have to be produced by a sintering operation. This sintering operation produces articles that inherently contain a relatively large proportion of voids which degrades their electrical characteristics. Ferrites are sintered mixtures generally of a spinel crystal structure having the formula $MO \cdot Fe_2O_3$ in which M can be any one or mixture of various metals including magnesium, manganese, zinc, copper, etc. These ferrites are fully considered in the Snoek U.S. Patents Nos. 2,452,529, 2,452,530, 2,452,531, 2,551,711. As in the ceramics, voids are undesirable in ferrites both from electrical and mechanical considerations. Also with both types of these sintered bodies the electrical characteristics appear to be dependent on its grain structure which grain structure is subject to extreme variations when following the procedures of the art.

It is an object of this invention to produce a new and improved type of sintered body of a ceramic or ferrite which is not subject to the above difficulties.

It is a further object of this invention to produce sintered crystalline bodies having more uniform grain structure.

These and other objects will be apparent from the following disclosure and from the claim.

The difficulties of the prior art have been found to be overcome by the use of a flux that melts below the melting point of the particles being bonded and while molten at least partially dissolves the particles and effectively vaporizes below the sintering temperature of the particles. The invention finds particular utility in the sintering of such crystalline materials as the titanates and the ferrites because of the former decompose at relatively low temperatures while the latter are subject to random grain growth.

The fluxes which have been found suitable for the titanate crystals have melting points between about 900° C. and about 1250° C. and are readily volatilized from the crystalline mass during the sintering operation which is conventionally conducted within the temperature range of 1250° C. to 1350° C. With the ferrites particular fluxes exhibit marked influence upon the grain growth so that exceptional electrical characteristics are obtained as a result of the use of those fluxes although the invention in its broadest scope results in electrical and mechanical improvements of an unexpected magnitude over the article produced by the art.

In accordance with this invention it is preferred to use cesium fluoride, lithium iodide and manganese chloride as volatile fluxes either singly or mixed with the titanate ceramics because these particular fluxes exhibit exceptional modification of the grain structure, effect a relatively void free crystal of high density and improved dielectric characteristic, particularly a higher dielectric constant and higher breakdown voltage. Other compounds may be used as the flux within the scope of the invention achieving almost comparable results. These other fluxes include lead bromide, lead chloride, lead iodide, and cobalt chloride. For the ferrite application generally all of the above recited fluxes are suitable although certain ones effect improved permeability. The reason for this is not fully understood, although it is believed that in particular the use of certain fluxes inhibit conventional grain growth so that much smaller grains are produced. With the ferrites additionally one can tolerate higher boiling point fluxes so that the overall range for the ferrites is extended to about 1350° C. It is interesting to note that ferrites have a broader range of boiling points of the volatile fluxes not only tolerating higher temperatures as noted above but also fluxes of lower boiling points that is down to 400° C. and lower. Those fluxes which more effectively accomplish the improved electrical characteristics of these ferromagnetic materials are the various halide salts of lead, lithium and cobalt having appropriate boiling points. Compounds representative are lead bromide, lead chloride, lead iodide, lead fluoride, lithium bromide, lithium chloride, lithium iodide and cobalt chloride. Other salts suitable as a flux for the ferrites in addition to all of those set forth above include rubidium bromide, rubidium iodide, cesium iodide, cesium bromide, cesium chloride, indium fluoride, aluminum fluoride and barium chloride.

In accordance with the present invention the flux can, for example, be applied to the surface of the material to be sintered after it has been pressed into the desired form, or it can be mixed, intimately, or otherwise, with the ceramic or ferrite particles before they are pressed into shape. When the flux is only applied to the surface of the formed mass, its action is concentrated on the surface and the resulting ceramic has thus a surface layer of substantially reduced void content. Such ceramics are exceptionally useful for capacitor applications as the electrodes subsequently fired onto the surface of the sintered product do not substantially penetrate into the body. In the case of thin sheets of ceramic, the surface effect of externally applied flux will extend through the entire sheet when it has a thickness in the order of 10 to 15 mils. When the flux is mixed with the ceramic particles, it is advisable for the purpose of reducing the void content, to provide the flux in the form of very finely divided powder that is substantially completely distributed throughout the interstices between the pressed ceramic particles, and thus does not appreciably increase the total bulk of the ceramic. In the fabrication of ferrite bodies it is preferred that the flux be substantially mixed throughout the entire body as taught above. The flux can then affect both the surface dissolution and modification of grain growth upon each particle uniformly.

As one example of this invention, perovskite crystals of 79% $BaTiO_3$ and 21% $SrTiO_3$ passing through a 200 mesh screen were mixed with 10% by weight cesium fluoride particles finer than 350 mesh and formed into a disc having a thickness of 3/32 of an inch and a diameter of 2 inches. Four percent by weight of a hydrocarbon organic binder, beeswax, was used as a binder for the mixture during the pressing operation by means of which the disc was produced. This material was then fired at 1300° C. for 3 hours after which the resulting ceramic was found highly densified, that is it did not possess the voids that are found in ceramic titanate bodies produced by conventional processes of the art as disclosed in the co-pending application, now Patent No. 2,855,317.

Further examples of the invention are as follows: Barium carbonate, 197.4 grams, titanium dioxide, 80.1 grams, and 13.8 grams of manganese chloride were mixed and sifted through a 250 mesh screen. To this was added 30 grams of a 20% by weight polyvinyl alcohol aqueous gel. A portion of the resulting mixture was compressed into a disc having a thickness of ½" and a diameter of 1.5". The compressed disc was fired in an air atmosphere at 1250° C. for 4 hours resulting in a highly densified body of sintered particles having individual grains of from 1.5 to 2 microns diameter.

The titanate composition of barium titanate and strontium titanate set forth above was formed into a disc 4 mils thick and 1" in diameter. The resulting disc was dipped in an aqueous solution containing 5% by weight of lithium iodide and thereafter fired at 1300° C. for 3 hours in an air atmosphere to produce a body having an apparently impervious surface.

Stoichiometrically equal amounts of nickel oxide and ferric oxide were dissolved in a molten medium of potassium chloride for several hours. After removal of the potassium chloride nickel ferrite particles ranging in size from about .2 micron to 1 micron were obtained. These resulting particles are compressed with 3% by weight of dextran and 4% by weight of powdered lithium bromide. The resulting compressed article was fired for 2 hours at 1327° C. and thereafter allowed to cool in the oven to room temperature. The ferrite has increased permeability over products not produced in accordance with this process, particularly at frequencies of from 2 to 400 megacycles.

A mixture of metallic oxides was prepared in the following proportions, all percentages being by weight:

| | Percent |
|---|---|
| Ferric oxide | 67 |
| Zinc oxide | 10.5 |
| Manganese oxide | 22.5 |

These ingredients were thoroughly mixed and afterwards calcined at a temperature of 1025° C. for about 3 hours. The mixture was then ground by ball milling for about 5 hours with an amount of water equal to about the weight of the metallic oxides. After milling, the slurry was dried on a steam heated drum dryer to a moisture content of .5%. To the dried mixture was added about 8% by weight of a water emulsion of a paraffin wax to serve as a binder and 20% by weight of a water dispersion containing 10% by weight of lead chloride to form a plastic mass. The mass was pelletized and dried to a moisture content of about 0.25%. The compressed article was fired at a temperature of about 1250° C. for 1 hour with the resulting product having an exceptionally dense structure. Comparable results are achieved with the substitution of cobalt chloride for the lead chloride in the above example.

A mixture of 25.5 mol percent of pure magnesium oxide, 25.5 mol percent of pure zinc oxide and 49 mol percent pure iron oxide was ground in a ball mill for 8 hours after having added 5% by weight of lead fluoride. The resulting mixture was compression molded into a ring (diameter of 3 cms. and a cross section of 4 mms.) by a pressure of 4 tons per square centimeter. The ring was fired for one hour at 1400° C. in presence of oxygen. The product has exceptional permeability characteristics.

The fluxes which have been set forth are useful in additions of from about 1 to about 10% by weight of the mass being sintered. If desired, the formed bodies can be subjected to an atmosphere of decreased pressure while they are being fired, in order to aid in the volatilization of the flux.

By virtue of this invention one can produce high dielectric constant ceramics particularly useful in the condenser art. Further, it is possible to produce these ceramics in a form much thinner and less fragile than those hitherto known. Such improvements thus make possible units of increased capacity per unit volume answering the present demand of miniaturization for television and radio equipments. The ferrite bodies not only achieve greater density but have improved permeability as well as increased mechanical strength.

An important feature of this invention is that it is possible to bond ceramics such as titanates and ferrites without altering their respective crystal structure. This is extremely important as the properties of these materials, which it is desired to retain, depend upon their crystal structure. At the edges of the crystals where the actual bond occurs, no appreciable alteration occurs so long as the decomposition temperatures of the crystals are not exceeded.

It is to be understood that this invention is broader than the specific embodiments set forth. It is within the skill of the art to determine the most desirable proportions of flux and dielectric crystals used in order to obtain the optimum results. Accordingly, the invention herein described is to be measured only by the scope of the appended claim.

I claim:

A method of producing a sintered ceramic body containing barium titanate comprising the steps of intimately mixing ceramic particles of barium titanate with a volatile metal halide flux in which said particles are at least partially soluble when the flux is molten, said flux being substantially completely distributed in the interstices between said ceramic particles and having a boiling point within the range of from about 900° C. to about 1250° C., compression molding said mixture into a body, firing said body at a temperature above the boiling point of said flux until said flux is substantially completely volatilized.

References Cited in the file of this patent

UNITED STATES PATENTS

| 1,037,999 | Saunders | Sept. 10, 1912 |
| 2,377,910 | Wainer et al. | June 12, 1945 |
| 2,424,111 | Navias | July 15, 1947 |
| 2,515,790 | Navias | July 18, 1950 |
| 2,598,707 | Matthias | June 3, 1952 |
| 2,768,901 | Tombs | Oct. 30, 1956 |

OTHER REFERENCES

Searle: Refractory Materials (1950), 3rd edition, pages 351 and 353.